(12) United States Patent
Ukuda

(10) Patent No.: US 11,156,750 B2
(45) Date of Patent: Oct. 26, 2021

(54) LAMINATED DIFFRACTIVE OPTICAL ELEMENT AND METHOD FOR MANUFACTURING LAMINATED DIFFRACTIVE OPTICAL ELEMENT

(71) Applicant: CANON KABUSHIKI KAISHA, Tokyo (JP)

(72) Inventor: Hideo Ukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 15/607,331

(22) Filed: May 26, 2017

(65) Prior Publication Data

US 2017/0343709 A1   Nov. 30, 2017

(30) Foreign Application Priority Data

May 31, 2016   (JP) .............................. JP2016-109440

(51) Int. Cl.
   *G02B 5/18*   (2006.01)
   *G02B 27/00*  (2006.01)
   *G02B 27/42*  (2006.01)

(52) U.S. Cl.
   CPC ......... *G02B 5/1866* (2013.01); *G02B 5/1847* (2013.01); *G02B 5/1852* (2013.01); *G02B 27/0018* (2013.01); *G02B 27/0025* (2013.01); *G02B 27/4272* (2013.01); *G02B 2207/121* (2013.01)

(58) Field of Classification Search
   CPC ...... G02B 5/18; G02B 5/1847; G02B 5/1852; G02B 5/1866; G02B 5/1876; G02B 27/0018; G02B 27/0025; G02B 27/0037; G02B 27/42; G02B 27/4272; G02B 2207/121; G02B 27/00; B29D 11/0073; B29D 11/00769
   USPC ....... 359/558, 566, 569, 576, 579, 565, 570; 264/1.36, 1.7
   See application file for complete search history.

(56) References Cited

U.S. PATENT DOCUMENTS

2008/0061481 A1*   3/2008   Otoshi ........................ C08J 5/18
                                                        264/638
2013/0077170 A1*   3/2013   Ukuda ............... B29D 11/0073
                                                        359/566

FOREIGN PATENT DOCUMENTS

| JP | 2003-270401 A | 9/2003 |
| JP | 2008-203821 A | 9/2008 |
| JP | 2011-237491 A | 11/2011 |
| JP | 2012-046671 A | 3/2012 |

* cited by examiner

*Primary Examiner* — Jie Lei
(74) *Attorney, Agent, or Firm* — Canon U.S.A., Inc., IP Division

(57) ABSTRACT

A laminated diffractive optical element includes a first resin layer having a first lattice shape and a second resin layer having a second lattice shape. The first resin layer and the second resin layer are laminated in this order on a first substrate so that the lattice shapes oppose each other. The first resin layer contains a resin and transparent conductive particles. The transparent conductive particles have an average particle size of 1 nm to 100 nm. A ratio of a polymer of an energy curable resin raw material having a long diameter of 1 μm to 10 μm in the first resin layer is 70 pieces/mm³ or less.

21 Claims, 3 Drawing Sheets

(a) TOP VIEW (b) SECTIONAL VIEW

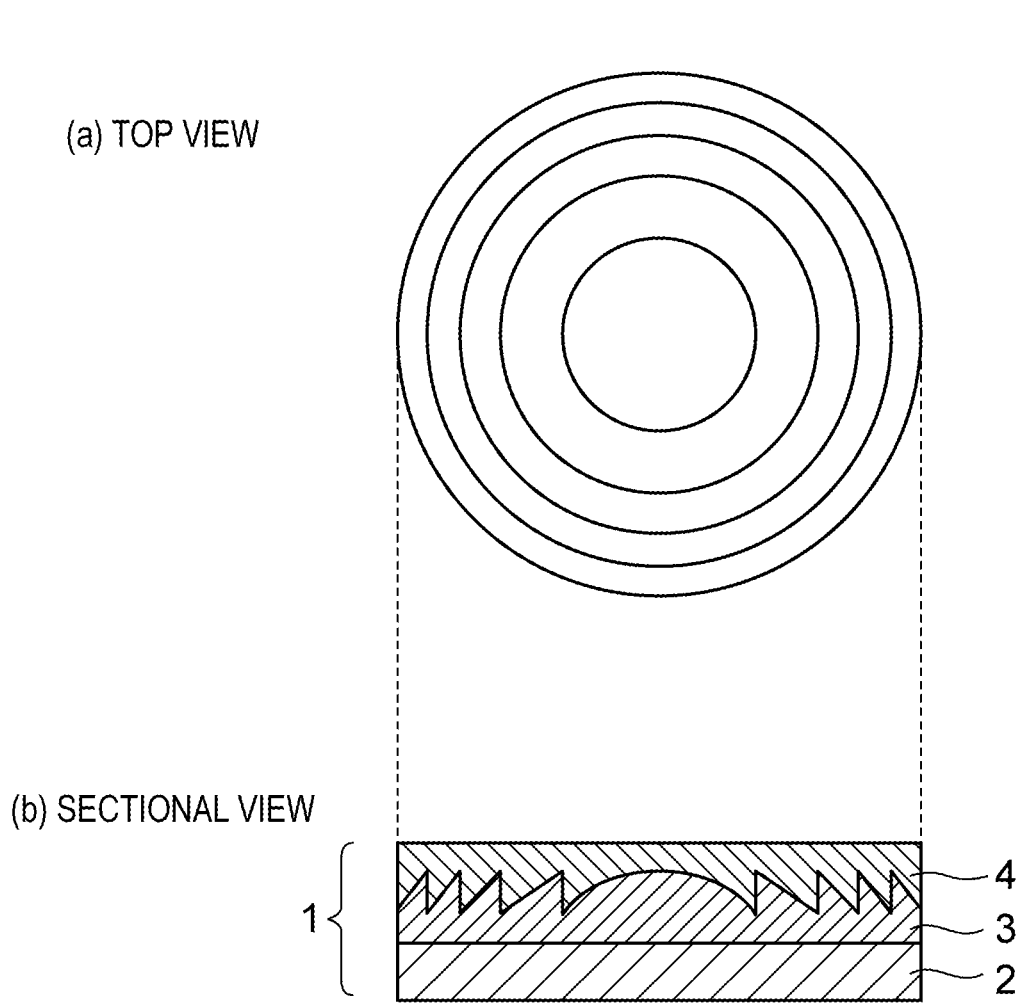

LAMINATED DIFFRACTIVE OPTICAL ELEMENT AND METHOD FOR MANUFACTURING LAMINATED DIFFRACTIVE OPTICAL ELEMENT

BACKGROUND OF THE INVENTION

Field of the Invention

The present disclosure relates to a laminated diffractive optical element used for a camera and a video or the like, and a method for manufacturing the same.

Description of the Related Art

A refractive optical element has been known to be combined with a diffractive optical element canceling the chromatic aberration of the refractive optical element in an optical system to allow the occurrence of the chromatic aberration in few optical elements to be suppressed.

Japanese Patent Laid-Open No. 2008-203821 describes a laminated diffractive optical element in which a high refractive index-low dispersion first layer containing dispersed inorganic fine particles and a low refractive index-high dispersion second layer containing dispersed transparent conductive particles are laminated in a close fashion. The laminated diffractive optical element described in Japanese Patent Laid-Open No. 2008-203821 exhibits high diffraction efficiency in the whole visible region.

SUMMARY OF THE INVENTION

A laminated diffractive optical element includes a first resin layer having a first lattice shape and a second resin layer having a second lattice shape. The first resin layer and the second resin layer are laminated in this order on a first substrate so that the lattice shapes oppose each other. The first resin layer contains a resin and transparent conductive particles. The transparent conductive particles have an average particle size of 1 nm to 100 nm. A ratio of a polymer of an energy curable resin raw material having a long diameter of 1 μm to 10 μm in the first resin layer is 70 pieces/mm$^3$ or less.

Further features of the present disclosure will become apparent from the following description of exemplary embodiments (with reference to the attached drawings).

BRIEF DESCRIPTION OF THE DRAWINGS

FIG. 1 is a schematic view illustrating an example laminated diffractive optical element.

DESCRIPTION OF THE EMBODIMENTS

Figure 2A:
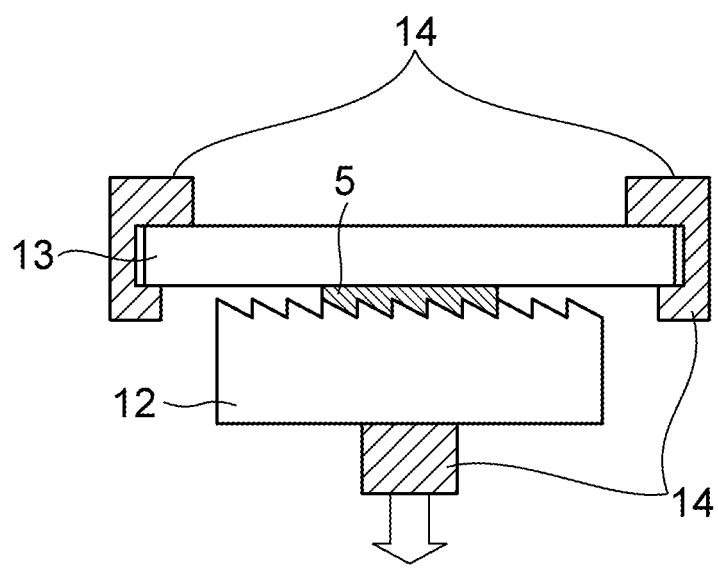
FIGS. 2A and 2B are schematic views illustrating a method for producing the laminated diffractive optical element.

In order to manufacture a laminated diffractive optical element described in Japanese Patent Laid-Open No. 2008-203821, a dispersion liquid containing transparent conductive particles made of indium tin oxide (ITO) or the like is mixed with a resin to generate countless polymers each having a long diameter of about 1 to about 10 μm when a solvent is eliminated. As a result, when the laminated diffractive optical element is produced, a portion having a different refractive index occurs, so that the manufacturing ratio of a diffractive optical element having an appearance malfunction (cloud is observed when intense light is applied) is increased.

The present example embodiments have been made in view of such a background. It is an object of the present disclosure to provide a laminated diffractive optical element which includes a resin layer containing transparent conductive particles made of ITO or the like and suppresses the appearance malfunction.

Hereinafter, an example embodiment will be described in detail.

The present inventors found that a number of polymers of an energy curable resin having a long diameter of 1 μm to 10 μm were generated in a laminated diffractive optical element including a resin layer containing transparent conductive particles in an energy curable resin. The present inventors inferred that since the transparent conductive particles had conductivity unlike a normal metal oxide, the transparent conductive particles had a catalyst action against a monomer having a polymerization group, and a slight polymerization reaction occurred before the energy curable resin was cured by applying energy, which generated a number of polymers. Such a polymer could not be sufficiently filtered with a filter, which caused the appearance malfunction of the laminated diffractive optical element.

The present inventors found that a solvent was eliminated while an oxygen partial pressure was controlled by atmospheric air opening when the solvent was eliminated from a solution containing an energy curable resin raw material and transparent conductive particles, which caused deterioration in the catalyst action of the transparent conductive particles, so that the occurrence of a polymer could be suppressed.

A lamination type diffraction lattice produced by the manufacturing method has an excellent appearance, wherein the ratio of the polymer of the energy curable resin is 70 pieces/mm$^3$ or less, in the resin layer containing the energy curable resin and the transparent conductive fine particles.

(Lamination Type Optical Element)

A lamination type optical element can be used for a mirror, a lens, a prism, and a filter. Among them, the lamination type optical element can be suitably used for the lens.

A lamination type optical element 1 has a constitution in which a relatively high refractive index-low dispersion first resin layer 3 having a first diffraction lattice shape and a relatively low refractive index-high dispersion second resin layer 4 are laminated in a close fashion on a transparent substrate 2, as illustrated in FIG. 1. The laminating sequence of the first resin layer 3 and the second resin layer 4 may be reverse. The first resin layer 3 contains the transparent conductive particles. The first resin layer 3 and the second resin layer 4 may be sandwiched between transparent substrates from both sides.

(Substrate)

For a substrate 2, a glass substrate and a glass lens or the like are used, for example. Each of the surfaces of the substrate 2 may be a plane, may have a spherical shape, or may have an aspherical shape.

(First Resin Layer)

The first resin layer 3 contains a resin and transparent conductive particles.

A thermoplastic resin or an energy curable resin can be used for the resin. The energy curable resin preferably contains at least one selected from the group consisting of an acrylic resin, a vinyl resin, and an epoxy resin.

In the first resin layer 3, the ratio of a polymer of an energy curable resin raw material having a long diameter of 1 µm to 10 µm is 70 piece/mm$^3$ or less, and preferably 30 piece/mm$^3$ or less. When the ratio of the polymer of the first resin layer 3 is more than 70 pieces/mm$^3$, the manufacturing ratio of a diffractive optical element having a deteriorated appearance is increased. Since the polymer of the energy curable resin raw material is a region in which the ratio of the transparent conductive particles is less than 3% by volume, and has a different transparent conductive particle concentration from that of the surround, the difference between refractive indices occurs, so that the polymer functions as a scattering body. The polymer of the energy curable resin raw material can be visually confirmed by observing the first resin layer 3 at a 200 to 500-fold magnification with an optical microscope.

(Transparent Conductive Particles)

As the transparent conductive particles, indium tin oxide (ITO), antimony-doped tin oxide (ATO), zinc-doped indium oxide (IZO), aluminum-doped zinc oxide (AZO), fluoride-doped tin oxide (FTO), and SnO$_2$ can be used. Among these, indium tin oxide (ITO) is preferably used. Among the currently existing materials, indium tin oxide (ITO) has a low second-order dispersion characteristic ($\theta$gF) and in particular, maintains the highest transparency.

In accordance with a solvent in which a monomer formed into a base resin and the fine particles are dispersed in advance, various surface treatment agents and dispersants are preferably used on the surfaces of the fine particles.

As the average particle size of the transparent conductive particles, a particle diameter which has no adverse influence on the optical transmittance and the optical scattering or the like is preferable. The average particle size is 1 to 100 nm, preferably 2 to 30 nm, and particularly preferably 2 to 20 nm. However, for example, even if the average particle size is 20 nm or less, when the distribution of the particle diameter is broad, and the volume content rate of particles having a particle diameter of more than 30 nm is 5% or more of all the fine particles (including the case in which fine particles are aggregated), the optical scattering is considerably adversely affected. In the case described above, by a filtering treatment using a filter having a pore size relatively smaller than the size of particles to be eliminated, unnecessary large fine particles are preferably eliminated. The fine particles can be eliminated in a state (fine particle dispersion liquid) in which fine particles are dispersed in a solvent before a base resin is mixed, or in a state in which the base resin is dissolved in the fine particle dispersion liquid. Although dependent on the viscosity, the fine particles can be eliminated in a state in which the solvent is eliminated from the state described above to form a non-solvent mixture of the base resin and the fine particles.

If needed, a surface treatment is preferably performed on the fine particles. The surface treatment may be performed when the fine particles are synthesized or formed or may be performed separately after the fine particles are obtained.

The volume content rate of the transparent conductive particles in the first resin layer 3 is 3% by volume to 29% by volume, and preferably 5% by volume to 23% by volume. When the volume content rate is less than 1% by volume, an effect of optical characteristics such as an improvement in diffraction efficiency is decreased. When the volume content rate is more than 29% by volume, moldability is deteriorated.

(Dispersant)

If needed, a surface treatment is preferably performed on the transparent conductive particles. The surface treatment may be performed when the fine particles are synthesized or formed or may be performed separately after the fine particles are obtained.

In order to prevent the transparent conductive particles from being aggregated, a surface treatment agent or a dispersant (surfactant) is preferably used to form a uniform dispersion state. In general, it has been known that when fine particles are dispersed in a solvent or a resin or the like using a surface treatment agent or a dispersant, different dispersion states are obtained depending on the type, amount, molecular weight, polarity, and affinity, or the like of the surface treatment agent and the dispersant to be added. As the surface treatment agent and the dispersant, a pigment derivative, a resin type agent, and an activator type agent can be preferably used. Herein, as the surface treatment agent and the dispersant, cationic, weak cationic, nonionic, or ampholytic surfactant is effectively used. In particular, polyester-based, ε-caprolactone-based, polycarboxylic acid salt, polyphosphate salt, hydrostearate salt, amidosulfonate salt, polyacrylate salt, olefin-maleate salt copolymer, acrylic-maleate salt copolymer, alkylamine acetate salt, alkyl fatty acid salt, fatty acid poly(ethylene glycol) ester-based, silicone-based, and fluorine-based surfactant may be used; however, at least one type of basic compounds selected from ammonium and organic amines is preferably used. Specific examples thereof include DISPERBYK-161, 162, 163, and 164 of DISPERBYK Series (manufactured by BYK Japan KK), Solsverse 3000, 9000, 17000, 20000, 24000, and 41090 of Solsverse Series (manufactured by Zenega Co., Ltd.), and PO or EO modified products of alkylamines, such as TAMN-15, of TAMN Series (manufactured by Nikko Chemicals Co., Ltd.). The addition amount of the surface treatment agent and the dispersant is changed depending roughly on the type of surface treatment agent and dispersant, the type of fine particles, the surface area thereof (diameter of fine particles), the type of dispersion resin in which the fine particles are mixed, and the type of dispersion solvent. As the addition amount of the surface treatment agent and the dispersant, with respect to the mass of the transparent conductive particles, the amount is preferably in a range of 0.1 to 35.0% by mass, and more preferably in a range of 4.0 to 25.0% by mass. When the addition amount of the dispersant is excessive, cloudiness occurs, so that the optical scattering occurs, and the properties (refractive index, Abbe's number, second-order dispersion characteristic, and elastic modulus or the like) of the composition which contains the fine particle are unnecessarily deteriorated. The surface treatment agents and the dispersants may be used alone, or at least two types thereof may be used in combination.

(Second Resin Layer)

The second resin layer 4 preferably contains at least one selected from the group consisting of an acrylic resin, a vinyl resin, and an epoxy resin.

The second resin layer 4 preferably contains inorganic particles.

The inorganic particles may be made of aluminum oxide or zirconium oxide or the like. When a fluorinated resin layer is used in the first resin layer, the inorganic particles are unnecessary in some cases.

As the average particle size of the inorganic particles, a particle diameter which has no adverse influence on the optical transmittance and the optical scattering or the like is preferable. The average particle size is 1 to 100 nm, preferably 2 to 30 nm, and particularly preferably 2 to 20 nm. However, for example, even if the average particle size is 20 nm or less, when the distribution of the particle diameter is broad, and the volume content rate of particles having a particle diameter of more than 30 nm is 5% or more of all the fine particles (including the case in which fine particles are aggregated), the optical scattering is considerably adversely affected. In the case described above, by a filtering treatment using a filter having a pore size relatively smaller than the size of particles to be eliminated, unnecessary large fine particles are preferably eliminated.

If needed, a surface treatment is preferably performed on the fine particles. The surface treatment may be performed when the fine particles are synthesized or formed or may be performed separately after the fine particles are obtained.

The volume content rate of the fine particles as the transparent conductive particles in the resin composition for forming the second resin layer is 3% by volume to 29% by volume, and preferably 5% by volume to 23% by volume.

(Method for Manufacturing Lamination Type Optical Element)

An example method for manufacturing the lamination type optical element will be described.

(Step of Obtaining First Resin Material)

A step of repeating reduction in a pressure and atmospheric air opening to eliminate a solvent from a solution obtained by mixing transparent conductive particles and an energy curable resin raw material in the solvent, thereby obtaining a first resin material will be described.

After the surface treatment agent or the dispersant in an appropriate amount is first dissolved in a selected solvent, and the transparent conductive particles are added thereto, a shearing force is applied to the mixture thus prepared to pulverize aggregates of the conductive particles, and remaining aggregates are eliminated by centrifugal separation and a filter treatment, so that a uniform fine particle dispersion liquid is obtained. Subsequently, a photopolymerizable monomer or oligomer and a photopolymerization initiator are dissolved in the above dispersion liquid. When the monomer or the oligomer is dissolved in the fine particle dispersion liquid, the solvent, the surface treatment agent, and the dispersant are preferably used in combination so that the dispersion state of the fine particles is not deteriorated by the addition of the monomer or the oligomer. If needed, by performing a filtering treatment, aggregated conductive particles are eliminated.

As a dispersion solvent used, in order to dissolve a monomer and an oligomer or the like, each of which is an energy curable resin raw material, or to disperse the transparent conductive particles in a solvent, if needed, the solvent is used to dissolve a surface treatment agent and a dispersant.

Examples of the dispersion solvent include, but are not limited to, aromatic hydrocarbons such as toluene, benzene, and xylene; alcohols such as ethanol and isopropyl alcohol; alicyclic hydrocarbons such as cyclohexane; acetates such as ethyl acetate and butyl acetate; ketones such as acetone and methyl ethyl ketone; amides such as dimethyl formamide (DMF), dimethyl acetamide (DMAc), and N-methylpyrrolidone (NMP); aliphatic hydrocarbons such as hexane and octane; ethers such as diethyl ether and butyl carbitol; and halogenated hydrocarbons such as dichloromethane and tetrachloro carbon. In accordance with the affinity of the transparent conductive particles to be used and the affinity of the surface treatment agent and the dispersant to be used, the dispersion solvent may be selected. The dispersion solvents may be used alone, or at least two types thereof may be used in combination as long as the dispersibility is not adversely influenced.

Next, the energy curable resin raw material will be described. As the energy curable resin raw material, a monomer or an oligomer, which is a binder component as the base resin, is used. As the monomer or the oligomer, a solvent in which the transparent conductive particles are dispersed, and a material which is compatible with a surface treatment agent or a dispersant are preferable.

The monomer described above is not particularly limited, as long as being a compound having at least one unsaturated group, such as a double bond or a triple bond, in its molecule. Specific examples of a monomer or an oligomer of the compound having an unsaturated group include: monofunctional acrylates or methacrylates such as 1,4-divinylcyclohexane, 1,4-cyclohexane dimethanol divinyl ether, 4,4-dimethyl-kept-1-en-6-yne, divinylbenzene, 1,6-divinylnaphthalene, N-vinylpyrrolidone, N-vinylcaprolactam, ethoxylated bisphenol A divinyl ether, propoxylated bisphenol A divinyl ether, poly(ethylene glycol) mono(meth)acrylate, polypropylene glycol mono(meth)acrylate, and phenoxyethyl (meta)acrylate; and polyfunctional acrylates or methacrylates such as poly(ethylene glycol) di(meth)acrylate, poly(propylene glycol) di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, and tri(acryloxyethyl)isocyanurate; compounds which are (meth)acrylated after ethylene oxide or propylene oxide is added to a polyalcohol, such as glycerin or trimethylolethane; urethane acrylates; polyester acrylates; and epoxy acrylates obtained by a reaction between an epoxy resin and (meth)acrylic acid.

In the case of fluorinated monomers, examples of monomers forming preferable resins include a fluorinated acrylic monomer, a fluorinated methacrylic monomer, a fluorinated epoxy monomer, and a fluorinated vinyl monomer. Specific examples thereof include monomers and analogs thereof such as 2,2,2-trifluoroethyl acrylate, 2,2,3,3,3-pentafluoropropyl acrylate, 2-(perfluorobutyl)ethyl acrylate, 3-perfluorobutyl-2-hydroxypropyl acrylate, 2-(perfluorohexyl)ethyl acrylate, 3-perfluorohexyl-2-hydroxypropyl acrylate, 2-(perfluorooctyl)ethyl acrylate, 3-perfluorooctyl-2-hydroxypropyl acrylate, 2-(perfluorodecyl)ethyl acrylate, 2-(perfluoro-3-methylbutyl)ethyl acrylate, 3-(perfluoro-3-methylbutyl)-2-hydroxypropyl acrylate, 2-(perfluoro-5-methylhexyl)ethyl acrylate, 3-(perfluoro-5-methylhexyl)-2-hydroxypropyl acrylate, 2-(perfluoro-7-methyloctyl)ethyl acrylate, 3-(perfluoro-7-methyloctyl)-2-hydroxypropyl acrylate, 1H,1H,3H-tetrafluoropropyl acrylate, 1H,1H,5H-octafluoropentyl acrylate, 1H,1H,7H-dodecafluoroheptyl acrylate, 1H,1H,9H-hexadecafluorononyl acrylate, 1H-1-(trifluoromethyl)trifluoroethyl acrylate, 1H,1H,3H-hexafluorobutyl acrylate, 2,2,3,3,4,4,5,5-octafluorohexane-1,6-diacrylate, 2,2,2-trifluoroethyl methacrylate, 2,2,3,3,3-pentafluoropropyl methacrylate, 2-(perfluorobutyl)ethyl methacrylate, 3-perfluorobutyl-2-hydroxypropyl methacrylate, 2-(perfluorohexyl)ethyl methacrylate, 3-perfluorohexyl-2-hydroxypropyl methacrylate, 2-(perfluorooctyl) ethyl methacrylate, 3-perfluorooctyl-2-hydroxypropyl methacrylate, 2-(perfluorodecyl)ethyl methacrylate, 2-(perfluoro-3-methylbutyl)ethyl methacrylate, 3-(perfluoro-3-methylbutyl)-2-hydroxypropyl methacrylate, 2-(perfluoro-5-methylhexyl)ethyl methacrylate, 3-(perfluoro-5-methylhexyl)-2-hydroxypropyl methacrylate, 2-(perfluoro-7-methyloctyl) ethyl methacrylate, 3-(perfluoro-7-methyloctyl)-2-hydroxypropyl methacrylate, 1H,1H,3H-tetrafluoropropyl methacrylate, 1H,1H,5H-octafluoropentyl methacrylate, 1H,1H,7H-dodecafluoroheptyl methacrylate, 1H,1H,9H-hexadecafluorononyl methacrylate, 1H-1-(trifluoromethyl)trifluoroethyl methacrylate, 1H,1H,3H-hexafluorobutyl methacrylate, 2,2,3,3,4,4,5,5-octafluorohexane-1,6-dimethacrylate, hexafluoroepoxypropane, 3-perfluorobutyl-1,2-epoxypropane, 3-perfluorohexyl-1,2-epoxypropane, 3-perfluorooctyl-1,2-epoxypropane, 3-perfluorodecyl-1,2-epoxypropane, 3-(perfluoro-3-methylbutyl)-1,2-epoxypropane, 3-(perfluoro-5-methylhexyl)-1,2-epoxypropane, 3-(perfluoro-7-methyloctyl)-1,2-epoxypropane, 3-(2,2,3,3-tetrafluoropropoxy)-1,2-epoxypropane, 3-(1H,1H,5H-octafluoropentyloxy)-1,2-epoxypropane, 3-(1H,1H,7H-dodecafluoroheptyloxy)-1,2-epoxypropane, 3-(1H,1H,9H-hexadecafluorononyloxy)-1,2-epoxypropane, and 1,4-bis(2',3'-epoxypropyl)-perfluoro-n-butane.

These monomers may be used alone, or at least two types thereof may be used in combination. As a resin composition, a fluorinated polymer resin may also be selected. Examples of a copolymer include Nos. 702C, 703C, 704C, 705C, 706C, and 707C, and analogs thereof manufactured by Central Glass Co., Ltd.

Fluorinated monomers having a polymerizable functional group in its molecule, each of which functions as the monomer of the energy curable resin raw material, may be used alone, or at least two types thereof may be used in combination. At least one of the fluorinated monomers may be used together with the acrylate and the methacrylate mentioned above.

The contents of the monomer and the oligomer are 30% by volume to 98% by volume with respect to the energy curable resin raw material, and preferably 50% by volume to 90% by volume. When the content is less than 30% by volume, it is not preferable since the moldability is deteriorated. When the content is more than 98% by volume, it is not preferable since the ratio of the conductive fine particles is relatively decreased, so that the optical characteristics are not sufficiently obtained in some cases.

After it is confirmed that the fine particles are preferably dispersed without generating any precipitations thereof, the solvent is eliminated using an evaporator. In this step, in accordance with the boiling point of the solvent and the amount of a remaining solvent, or the like, it is preferable that the vacuum degree is appropriately adjusted. By rapid evaporation and elimination of the solvent, the aggregation of the fine particles may occur, and as a result, the dispersibility is deteriorated in some cases. When the solvent is eliminated at a reduced pressure, if needed, heating may be performed so as not to deteriorate the dispersibility. As described above, the energy curable resin which is the precursor used in the present disclosure is obtained.

In the energy curable resin thus obtained, a remaining solvent which cannot be eliminated is contained in some cases. When this content is more than 0.1% by mass, by a function to promote fine particle migration in energy curing, the gradient index (GI) and the light scattering are increased. Hence, the content of the remaining solvent is preferably 0.1% by mass or less.

The solvent is eliminated from the solution by repeatedly (1) subjecting the solution to a reduced pressure of 50 hPa or less and (2) opening an oxygen partial pressure to 60 hPa or more. The solvent is eliminated by repeating reduction in a pressure and atmospheric air opening. Specifically, the solvent is preferably eliminated by the following method. The atmospheric air opening is preferably performed so that the solution is subjected to a reduced pressure of 0 hPa to 50 hPa, and the oxygen partial pressure is controlled to 300 hPa (oxygen partial pressure: 63 hPa) to 1013.25 hPa (oxygen partial pressure: 213 hPa) once to 6 times in 1 hour. Thereby, by the atmospheric air opening, the oxygen partial pressure under the low atmospheric pressure is increased, and the decrease of the oxygen concentration in the solution is suppressed, so that the occurrence of the polymer caused by the polymerization of the energy curable resin raw material can be suppressed.

The solvent is preferably eliminated from the solution at a temperature of 30° C. to 42° C. The speed of the solvent elimination is decreased at a temperature of lower than 30° C. The cured product of the energy curable resin is easily produced at a temperature of higher than 42° C.

(Filtering Step)

The obtained first resin material is preferably filtered with a filter. A filter having filtration accuracy of 0.3 µm to 0.7 µm is preferably used in a filtering step, and a filter having filtration accuracy of 0.3 µm to 0.5 µm is more preferably used. When the filtration accuracy is less than 0.3 µm, the filtration time of the resin material is increased, or the filtration of the resin material is difficult. Herein, the filtration accuracy represents a particle diameter having a filtration ratio of 200 or more. A numerical value measured by a multipass testing method is used for the filtration ratio. The filtration ratio is calculated by (number of particles on filter inlet side)/(number of particles on filter outlet side) for the objective particle diameter or more.

(Step of Performing Energy Irradiation to Obtain First Resin Layer)

Next, a step of filling a space between a first substrate and a mold having a lattice shape with the first resin material filtered in the filtering step, and thereafter performing energy irradiation to obtain the first resin layer will be described.

Figure 2B:
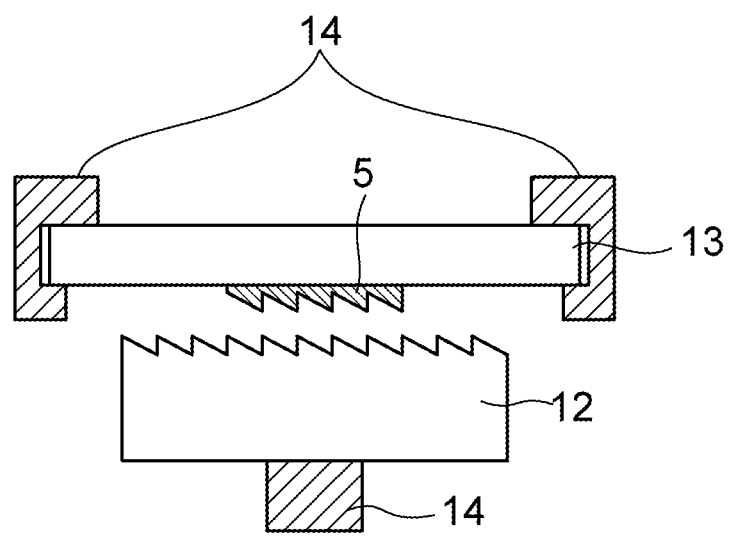

In the step of obtaining the first resin layer, as illustrated in FIG. 2A, a mold 12 having a lattice shape is filled with a first resin raw material 5, and a glass substrate 2 is disposed thereon. Then, the first resin raw material is cured by energy irradiation, thereby forming a first resin layer 3. Then, as illustrated in FIG. 2B, the first resin layer 3 is released from the mold.

(Step of Providing Second Resin Layer)

Next, the second resin layer is provided on the first resin layer so that the first lattice shape of the first resin layer and the second lattice shape of the second resin layer oppose each other.

Figure 3A:
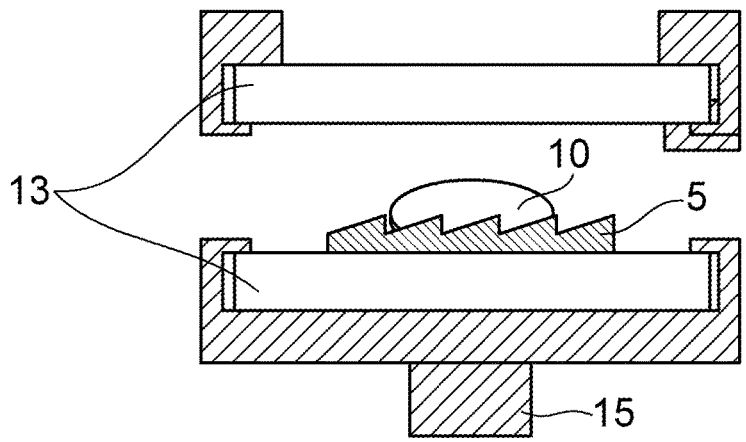
FIGS. 3A to 3C are schematic views illustrating a method for producing the laminated diffractive optical element.
Figure 3B:
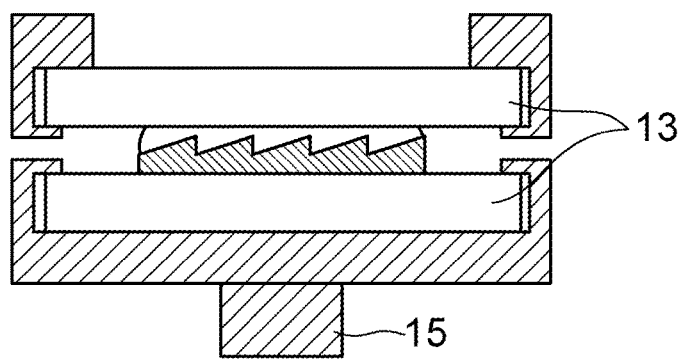

As illustrated in FIG. 3A, a member on which the first resin layer 3 is provided on a substrate 2 is set in a molding jig 15, and an energy curable second resin raw material are then dripped. As illustrated in FIG. 3B, a flat glass 13 is provided thereon to extend the second resin raw material. The second resin raw material is subjected to energy irradiation to provide a second resin layer 4. The molding jig 15 is eliminated, and annealing is performed to obtain a laminated diffractive optical element.

EXAMPLES

Hereinafter, a laminated diffractive optical element and a method for manufacturing the same will be specifically described.

The following measuring methods and valuation methods were performed.

<Measurement of Particle Diameters of Transparent Conductive Particles and Inorganic Particles>

The particle diameters of transparent conductive particles and inorganic particles were measured with a laser type particle size analyzer (ELSZ-1000Z manufactured by Otsuka Electronics Co., Ltd.). The particle diameter depending on the number standard was defined as an average particle size.

<Evaluation of Diffraction Efficiency>

As for the diffraction efficiency, after spot light was made incident on the above laminated diffractive optical element, and the amount of the whole transmitted light passing therethrough was measured by a light receiving portion in close contact with the element, the amount of light of the design order (first-order diffracted light) was measured, and the ratio in the amount of light (amount of light of design order/amount of whole transmitted light) was defined as the diffraction efficiency.

<Evaluation of Appearance of Laminated Diffractive Optical Element>

The produced laminated diffractive optical element was irradiated with light of a halogen lamp (halogen light source LA-100USW straight (product name): manufactured by AS ONE Corporation), and the occurrence of cloud was visually observed.

The evaluations were performed according to the following standards.

<Measurement of Remaining Solvent>

A remaining solvent was diluted about 100 fold with chloroform, and the diluted remaining solvent was quantitatively measured on the basis of the peak of naphthalene by a gas chromatography (5890 series II, manufactured by Hewlett Packard).

<Measurement of Refractive Index and Abbe's Number>

By using a refractometer (KPR-30, manufactured by Shimadzu Corp.), the refractive index at the g line (435.8 nm), the f line (486.1 nm), the e line (546.1 nm), the d line (587.6 nm), and the c line (656.3 nm) of a resin layer was measured from a high refractive index glass 4 side. From the measured refractive index, the Abbe's number was calculated.

<Ratio of Polymer of Energy Curable Resin Having Long Diameter of 1 µm to 10 µm>

A sample of 5000 µm×5000 µm×15 µm was cut from the resin layer using a microtome. The sample was observed at a magnification of 200 to 500 with an optical microscope (manufactured by Nikon Corporation). The number of the polymers (foreign substances) having a long diameter of 1 to 10 µm was measured, and converted into 1 mm$^3$. The measurements were performed at three places, and the average value thereof was defined as the ratio of the polymer of the energy curable resin.

Example 1

Preparation of First Resin Material 11

51.63 g of a fine-particle dispersion liquid (average particle size: 20 nm, concentration of indium tin oxide: 9.96% by mass, amount of a polycaprolactone-based high-molecular-weight dispersant: 2.19% by mass) in which indium tin oxide (ITO) was dispersed in a xylene solvent was mixed with 3.72 g of a mixture containing 20% by mass of tris(2-acryloxyethyl)isocyanurate, 25% by mass of pentaerythritol triacrylate, 40% by mass of dicyclopentenyl oxyethyl methacrylate, 13% by mass of urethane modified polyester acrylate, and 2% by mass of 1-hydroxycyclohexyl phenyl ketone as ultraviolet curable acrylic resin raw materials.

A flask in which this mixed solution was received was attached to an evaporator. An oil bath temperature was set to 45° C. An oil bath measured temperature was 42° C.

For the elimination of a solvent, an atmospheric pressure was changed to 20 hPa from a set atmospheric pressure of 300 hPa over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 5 minutes, and the atmospheric pressure was then returned to 300 hPa by atmospheric air opening. The above atmospheric pressure change was repeated for 40 hours, to eliminate a xylene solvent. Then, a first resin material 11 was prepared through a filter having filtration accuracy of 0.5 µm (SHPX-005-M25DKC: manufactured by Roki Techno Co., Ltd.).

By a TGA (manufactured by PerkinElmer, Inc.), the first resin material 11 was fired, and the inorganic solid component in the first resin material 11 was quantitatively measured, so that the content of 51.2% by mass was obtained.

The content of a remaining solvent (xylene) was 0.002% by mass.

The refractive index of a sample cured at 50 J, and thereafter annealed at 80° C. for 72 hours was measured.
Refractive index $(n_g, n_F, n_e, n_d, n_c)$=(1.599, 1.586, 1.575, 1.567, 1.556)
$(v_d, \theta_{gF})$=(19.0, 0.41)

The ratio of a polymer of an energy curable resin having a long diameter of 1 µm to 10 µm in the polymer of the first resin material 11 was 25 pieces/mm$^3$.

Preparation of Second Resin Material 21

163.3 g of a fine-particle dispersion liquid (average particle size of zirconium oxide particles: 10 nm, concentration of zirconium oxide: 10.02% by mass, concentration of a surface treatment agent: 2.72% by mass) in which zirconium oxide was dispersed in a toluene solvent was mixed with 9.20 g of a mixture containing 20% by mass of tris(2-acryloxyethyl)isocyanurate, 25% by mass of pentaerythritol triacrylate, 40% by mass of dicyclopentenyl oxyethyl methacrylate, 13% by mass of urethane modified polyester acrylate, and 2% by mass of 1-hydroxycyclohexyl phenyl ketone as ultraviolet curable acrylic resin raw materials. This mixed solution was received in an evaporator, and the toluene solvent was eliminated finally at an oil bath temperature of 45° C. and a set pressure of 3 hPa (5 hPa in actual measurement) for 15 hours, so that a second resin material 21 was prepared.

By a TGA (manufactured by PerkinElmer, Inc.), the second resin material 21 was fired, and the inorganic solid component in the second resin material 21 was quantitatively measured, so that the content of 54.5% by mass was obtained.

The content of a remaining solvent (xylene) was 0.005% by mass or less and was the detection limit or less.

The refractive index of a sample cured at 50 J, and thereafter annealed at 80° C. for 72 hours was measured. The measured results were as follows.
Refractive index $(n_g, n_F, n_e, n_d, n_c)$=(1.638, 1.630, 1.624, 1.620, 1.616)
$(v_d, \theta_{gF})$=(43.7, 0.57)

<Formation of Laminated Diffractive Optical Element 101>

First, as illustrated in FIG. 2A, an ITO fine-particle dispersion material 5 (first resin material 11) was disposed on a mold 12 having a diffraction lattice shape, and a glass substrate 13 having a thickness of 2 mm was disposed on the ITO fine-particle dispersion material 5. After curing was performed by light irradiation using a high pressure mercury lamp (EXECURE250, Hoya Cande Optronics Corp.) at 14.2 mW/cm² for 211 seconds and at 20 mW/cm² for 600 seconds (illuminance through the glass substrate 13, illuminance meter: UIT-250, light receiving portion: UVD-5365), as illustrated in FIG. 2B, the ITO fine-particle dispersion material 5 was eliminated from the mold. Subsequently, annealing was performed in the atmospheric air at 80° C. for 72 hours, so that a diffraction lattice was formed. The lattice height of the diffraction lattice measured after the annealing was 10.8 μm; the distance from the glass substrate 13 to the valley of the lattice was 2 μm (the average thickness of the ITO fine-particle dispersion material 5 was 7.4 μm); and the pitch was 80 μm.

Next, the ITO fine-particle dispersion material 5 molded on the flat glass plate 13 was set together therewith in a molding jig 15, and on the ITO fine-particle dispersion material 5, a high refraction index material 10 (second resin material 21) was dripped (FIG. 3A). Another flat glass plate 13 was provided thereon to extend the high refraction index material 10. As a result, a sample was formed in which a layer of the high refraction index material 10 having a length of 300 μm from an air interface to the ITO fine-particle dispersion material 5 and a 35 μm-thick layer of the high refraction index material 10 having a height larger than that of the lattice of the ITO fine-particle dispersion material 5 were provided (FIG. 3B). After the sample thus prepared was cured by light irradiation using a high pressure mercury lamp (EXECURE250, Hoya Cande Optronics Corp.) at 14.2 mW/cm² for 211 seconds and at 20 mW/cm² for 600 seconds (illuminance through the flat glass plate 13, illuminance meter: UIT-250, light receiving portion: UVD-5365), annealing was performed at 80° C. for 72 hours.

Figure 3C:
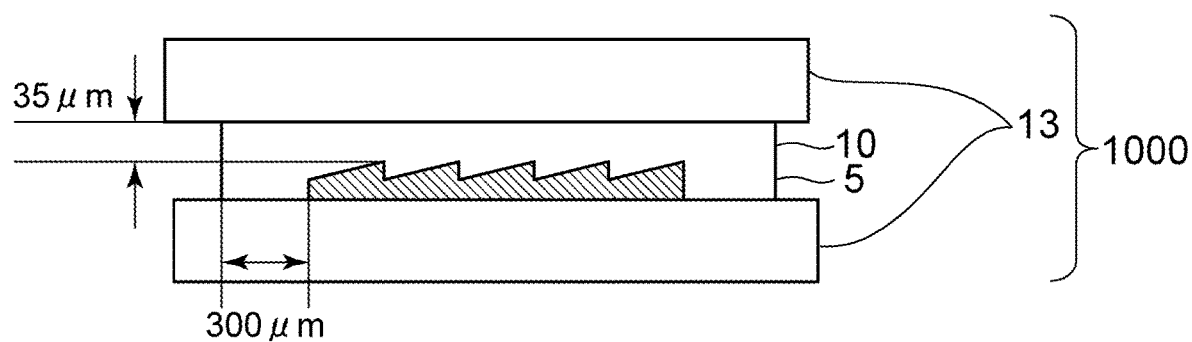

A laminated diffractive optical element 101 was formed. In FIG. 3C, the structure of the laminated diffractive optical element 101 is illustrated.

In the case of the laminated diffractive optical element 101, the diffraction efficiency in the whole visible region was 99.5% or more.

The evaluation of the appearance malfunction (cloud due to scattering observed when intense light was applied) of the laminated diffractive optical element was A (appearance defective ratio: 0%).

Example 2

Preparation of First Resin Material 12

After raw materials were charged and mixed as in the case of "the first resin material 11", a flask in which this mixed solution was received was attached to an evaporator. An oil bath temperature was set to 38° C. An oil bath measured temperature was 39° C.

For the elimination of a solvent, an atmospheric pressure was changed to 20 hPa from 500 hPa of a set atmospheric pressure over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 5 minutes, and the atmospheric pressure was then returned to 500 hPa. The above atmospheric pressure change was repeated for 40 hours, to eliminate a xylene solvent. Then, a first resin material 12 was prepared through a filter of 0.5 μm (SHPX-005-M25DKC: manufactured by Roki Techno Co., Ltd.).

By a TGA (manufactured by PerkinElmer, Inc.), the first resin material 12 was fired, and the inorganic solid component in the first resin material 12 was quantitatively measured, so that the content of 51.2% by mass was obtained.

The content of a remaining solvent (xylene) was 0.005% by mass.

The refractive index of a sample cured at 50 J, and thereafter annealed at 80° C. for 72 hours was measured. The measured results were as follows.
Refractive index $(n_g, n_F, n_e, n_d, n_c)$=(1.599, 1.586, 1.575, 1.567, 1.556)
$(\nu_d, \theta_{gF})$=(19.0, 0.41)

The ratio of a polymer of an energy curable resin having a long diameter of 1 μm to 10 μm in the first resin material 11 was 15 pieces/mm³.

<Production of Laminated Diffractive Optical Element 102>

A laminated diffractive optical element 102 was produced in the same manner as in Example 1 except that a first resin material 12 was used as an ITO fine-particle dispersion material 5 unlike Example 1.

In the case of the laminated diffractive optical element 102, the diffraction efficiency in the whole visible region was 99.5% or more.

The evaluation of the appearance malfunction (cloud due to scattering observed when intense light was applied) of the laminated diffractive optical element was A (appearance defective ratio: 0%).

Example 3

Preparation of First Resin Material 13

After raw materials were charged and mixed as in the case of "the first resin material 11", a flask in which this mixed solution was received was attached to an evaporator. An oil bath temperature was set to 34° C. An oil bath measured temperature was 35° C.

For the elimination of a solvent, an atmospheric pressure was changed to 20 hPa from 700 hPa of a set atmospheric pressure over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 5 minutes, and the atmospheric pressure was then returned to 700 hPa. The above atmospheric pressure change was repeated for 40 hours, to eliminate a xylene solvent. Then, a first resin material 13 was prepared through a filter of 0.5 μm (SHPX-005-M25DKC: manufactured by Roki Techno Co., Ltd.).

By a TGA (manufactured by PerkinElmer, Inc.), the first resin material 13 was fired, and the inorganic solid component in the first resin material 13 was quantitatively measured, so that the content of 51.2% by mass was obtained.

The content of a remaining solvent (xylene) was 0.002% by mass.

The refractive index of a sample cured at 50 J, and thereafter annealed at 80° C. for 72 hours was measured. The measured results were as follows.
Refractive index $(n_g, n_F, n_e, n_d, n_c)$=(1.599, 1.586, 1.575, 1.567, 1.556)
$(\nu_d, \theta_{gF})$=(19.0, 0.41)

The ratio of a polymer of an energy curable resin raw material having a long diameter of 1 μm to 10 μm in the first resin material 11 is 6 pieces/mm³.

<Production of Laminated Diffractive Optical Element 103>

A laminated diffractive optical element 103 was produced in the same manner as in Example 1 except that a first resin material 13 was used as an ITO fine-particle dispersion material 5 unlike Example 1.

In the case of the laminated diffractive optical element 103, the diffraction efficiency in the whole visible region was 99.5% or more.

The evaluation of the appearance malfunction (cloud due to scattering observed when intense light was applied) of the laminated diffractive optical element was A (appearance defective ratio: 0%).

Example 4

Preparation of First Resin Material 14

After raw materials were charged and mixed as in the case of "the first resin material 11", a flask in which this mixed solution was received was attached to an evaporator. An oil bath temperature was set to 29° C. An oil bath measured temperature was 30° C.

For the elimination of a solvent, an atmospheric pressure was changed to 20 hPa from 900 hPa of a set atmospheric pressure over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 5 minutes, and the atmospheric pressure was then returned to 900 hPa. The above atmospheric pressure change was repeated for 60 hours, to eliminate a xylene solvent. Then, a first resin material 14 was prepared through a filter of 0.5 μm (SHPX-005-M25DKC: manufactured by Roki Techno Co., Ltd.).

By a TGA (manufactured by PerkinElmer, Inc.), the first resin material 14 was fired, and the inorganic solid component in the first resin material 14 was quantitatively measured, so that the content of 51.2% by mass was obtained.

The content of a remaining solvent (xylene) was 0.003% by mass.

The refractive index of a sample cured at 50 J, and thereafter annealed at 80° C. for 72 hours was measured. The measured results were as follows.
Refractive index $(n_g, n_F, n_e, n_d, n_c)$=(1.599, 1.586, 1.575, 1.567, 1.556)
$(v_d, \theta_{gF})$=(19.0, 0.41)

<Production of Laminated Diffractive Optical Element 104>

A laminated diffractive optical element 104 was produced in the same manner as in Example 1 except that a first resin material 14 was used as an ITO fine-particle dispersion material 5 unlike Example 1.

In the case of the laminated diffractive optical element 104, the diffraction efficiency in the whole visible region was 99.5% or more.

The evaluation of the appearance malfunction (cloud due to scattering observed when intense light was applied) of the laminated diffractive optical element was A (appearance defective ratio: 0%).

Example 5

Preparation of First Resin Material 15

After raw materials were charged and mixed as in the case of "the first resin material 11", this mixed solution was received in an evaporator. An oil bath temperature was set to 41° C. An oil bath measured temperature was 42° C.

For the elimination of a solvent, an atmospheric pressure was changed to 20 hPa from a set atmospheric pressure of 300 hPa over 3 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 2 minutes, and the atmospheric pressure was then returned to 300 hPa. The above atmospheric pressure change was repeated for 40 hours, to eliminate a xylene solvent. Then, a first resin material 15 was prepared through a filter of 0.5 μm (SHPX-005-M25DKC: manufactured by Roki Techno Co., Ltd.).

By a TGA (manufactured by PerkinElmer, Inc.), the first resin material 15 was fired, and the inorganic solid component in the first resin material 15 was quantitatively measured, so that the content of 51.2% by mass was obtained.

The content of a remaining solvent (xylene) was 0.004% by mass.

The refractive index of a sample cured at 50 J, and thereafter annealed at 80° C. for 72 hours was measured. The measured results were as follows.
Refractive index $(n_g, n_F, n_e, n_d, n_c)$=(1.599, 1.586, 1.575, 1.567, 1.556)
$(v_d, \theta_{gF})$=(19.0, 0.41)

<Production of Laminated Diffractive Optical Element 105>

A laminated diffractive optical element 105 was produced in the same manner as in Example 1 except that a first resin material 15 was used as an ITO fine-particle dispersion material 5 unlike Example 1.

In the case of the laminated diffractive optical element 105, the diffraction efficiency was 99.5% or more.

The evaluation of the appearance malfunction (cloud due to scattering observed when intense light was applied) of the laminated diffractive optical element was A (appearance defective ratio: 0%).

Example 6

Preparation of First Resin Material 16

After raw materials were charged and mixed as in the case of "the first resin material 11", a flask in which this mixed solution was received was attached to an evaporator. An oil bath temperature was set to 41° C. An oil bath measured temperature was 42° C.

For the elimination of a solvent, an atmospheric pressure was changed to 20 hPa from a set atmospheric pressure of 300 hPa over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 20 minutes, and the atmospheric pressure was then returned to 300 hPa. The above atmospheric pressure change was repeated for 40 hours, to eliminate a xylene solvent. Then, a first resin material 16 was prepared through a filter of 0.5 μm (SHPX-005-M25DKC: manufactured by Roki Techno Co., Ltd.).

By a TGA (manufactured by PerkinElmer, Inc.), the first resin material 16 was fired, and the inorganic solid component in the first resin material 15 was quantitatively measured, so that the content of 51.2% by mass was obtained.

The content of a remaining solvent (xylene) was 0.006% by mass.

The refractive index of a sample cured at 50 J, and thereafter annealed at 80° C. for 72 hours was measured. The measured results were as follows.
Refractive index $(n_g, n_F, n_e, n_d, n_c)$=(1.599, 1.586, 1.575, 1.567, 1.556)
$(v_d, \theta_{gF})$=(19.0, 0.41)

The ratio of a polymer of an energy curable resin having a long diameter of 1 μm to 10 μm in the first resin material 11 was 30 pieces/mm$^3$.

<Production of Laminated Diffractive Optical Element 106>

A laminated diffractive optical element 106 was produced in the same manner as in Example 1 except that a first resin material 16 was used as an ITO fine-particle dispersion material 5 unlike Example 1.

In the case of the laminated diffractive optical element 106, the diffraction efficiency in the whole visible region was 99.5% or more.

The evaluation of the appearance malfunction (cloud due to scattering observed when intense light was applied) of the laminated diffractive optical element was A (appearance defective ratio: 0%).

Comparative Example 1

Preparation of First Resin Material 17

After raw materials were charged and mixed as in the case of "the first resin material 11", a flask in which this mixed solution was received was attached to an evaporator. An oil bath temperature was set to 45° C. An oil bath measured temperature was 46° C.

A set atmospheric pressure of 2 hPa (4 hPa in actual measurement) was held for 40 hours to eliminate a xylene solvent. Then, a first resin material 17 was prepared through a filter of 0.5 μm (SHPX-005-M25DKC: manufactured by Roki Techno Co., Ltd.).

By a TGA (manufactured by PerkinElmer, Inc.), the first resin material 16 was fired, and the inorganic solid component in the first resin material 17 was quantitatively measured, so that the content of 51.2% by mass was obtained.

The content of a remaining solvent (xylene) was 0.006% by mass.

The refractive index of a sample cured at 50 J, and thereafter annealed at 80° C. for 72 hours was measured. The measured results were as follows.

Refractive index $(n_g, n_F, n_e, n_d, n_c)$=(1.599, 1.586, 1.575, 1.567, 1.556)

$(v_d, \theta_{gF})$=(19.0, 0.41)

The ratio of a polymer of an energy curable resin having a long diameter of 1 μm to 10 μm in the first resin material 11 is 110 pieces/mm³.

<Production of Laminated Diffractive Optical Element 201>

A laminated diffractive optical element 201 was produced in the same manner as in Example 1 except that a first resin material 17 was used as an ITO fine-particle dispersion material 5 unlike Example 1.

In the case of the laminated diffractive optical element 201, the diffraction efficiency in the whole visible region was 99.5% or more.

The evaluation of the appearance malfunction (cloud due to scattering observed when intense light was applied) of the laminated diffractive optical element was C (appearance defective ratio: 40%).

Example 7

Preparation of First Resin Material 18

After raw materials were charged and mixed as in the case of "the first resin material 11", a flask in which this mixed solution was received was attached to an evaporator. An oil bath temperature was set to 45° C. An oil bath measured temperature was 46° C.

For the elimination of a solvent, an atmospheric pressure was changed to 20 hPa from a set atmospheric pressure of 300 hPa over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 5 minutes, and the atmospheric pressure was then returned to 300 hPa. The above atmospheric pressure change was repeated for 40 hours, to eliminate a xylene solvent. Then, a first resin material 18 was prepared through a filter of 0.5 μm (SHPX-005-M25DKC: manufactured by Roki Techno Co., Ltd.).

By a TGA (manufactured by PerkinElmer, Inc.), the first resin material 17 was fired, and the inorganic solid component in the first resin material 17 was quantitatively measured, so that the content of 51.2% by mass was obtained.

The content of a remaining solvent (xylene) was 0.004% by mass.

The refractive index of a sample cured at 50 J, and thereafter annealed at 80° C. for 72 hours was measured. The measured results were as follows.

Refractive index $(n_g, n_F, n_e, n_d, n_c)$=(1.599, 1.586, 1.575, 1.567, 1.556)

$(v_d, \theta_{gF})$=(19.0, 0.41)

The ratio of a polymer of an energy curable resin having a long diameter of 1 μm to 10 μm in the first resin material 11 was 70 pieces/mm³.

<Production of Laminated Diffractive Optical Element 107>

A laminated diffractive optical element 107 was produced in the same manner as in Example 1 except that a first resin material 18 was used as an ITO fine-particle dispersion material 5 unlike Example 1.

In the case of the laminated diffractive optical element 107, the diffraction efficiency in the whole visible region was 99.5% or more.

The evaluation of the appearance malfunction (cloud due to scattering observed when intense light was applied) of the laminated diffractive optical element was B (appearance defective ratio: 20%).

Example 8

Preparation of First Resin Material 19

After raw materials were charged and mixed as in the case of "the first resin material 11", a flask in which this mixed solution was received was attached to an evaporator. An oil bath temperature was set to 42° C.

For the elimination of a solvent, an atmospheric pressure was changed to 20 hPa from a set atmospheric pressure of 300 hPa over 5 minutes, and the atmospheric pressure was changed to 3 hPa (5 hPa in actual measurement) from 20 hPa over 5 minutes. Then, a set atmospheric pressure of 2 hPa (4 hPa in actual measurement) was held for 110 minutes, and the atmospheric pressure was then returned to 300 hPa. The above atmospheric pressure change was repeated for 40 hours, to eliminate a xylene solvent. Then, a first resin material 19 was prepared through a filter of 0.5 μm (SHPX-005-M25DKC: manufactured by Roki Techno Co., Ltd.).

By a TGA (manufactured by PerkinElmer, Inc.), the first resin material 19 was fired, and the inorganic solid component in the first resin material 17 was quantitatively measured, so that the content of 51.2% by mass was obtained.

The content of a remaining solvent (xylene) was 0.002% by mass.

The refractive index of a sample cured at 50 J, and thereafter annealed at 80° C. for 72 hours was measured. The measured results were as follows.

Refractive index $(n_g, n_F, n_e, n_d, n_C)$=(1.599, 1.586, 1.575, 1.567, 1.556)

$(v_d, \theta_{gF})$=(19.0, 0.41)

The ratio of a polymer of an energy curable resin having a long diameter of 1 μm to 10 μm in the first resin material 19 was 60 pieces/mm³.

<Production of Laminated Diffractive Optical Element 108>

A laminated diffractive optical element 203 was produced in the same manner as in Example 1 except that a first resin material 19 was used as an ITO fine-particle dispersion material 5 unlike Example 1.

In the case of the laminated diffractive optical element 203, the diffraction efficiency in the whole visible region was 99.5% or more.

The evaluation of the appearance malfunction (cloud due to scattering observed when intense light was applied) of the laminated diffractive optical element was B (appearance defective ratio: 20%).

applied) of an optical element such as a laminated diffractive optical element including a dispersion material containing transparent conductive particles.

Thereby, the present disclosure can be used for an optical element, a diffractive optical element, a laminated diffractive optical element, and an optical system, in particular, an image forming optical system, such as a camera or a video camera.

The present disclosure can provide an optical element suppressing flare and an appearance malfunction due to scattering of an optical element such as a laminated diffractive optical element including a dispersion material containing transparent conductive particles such as indium tin oxide (ITO).

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109440, filed May 31, 2016, which is hereby incorporated by reference herein in its entirety.

TABLE 1

| | Example 1 | Example 2 | Example 3 | Example 4 | Example 5 | Example 6 | Comparative Example 1 | Example 7 | Example 8 |
|---|---|---|---|---|---|---|---|---|---|
| Solvent elimination condition | Intermittent atmospheric air pressure opening | Intermittent atmospheric air pressure opening | Intermittent atmospheric air pressure opening | Intermittent atmospheric air pressure opening | Intermittent atmospheric air pressure opening | Intermittent atmospheric air pressure opening | Continuation | Intermittent atmospheric air pressure opening | Intermittent atmospheric air pressure opening |
| Atmospheric pressure control | | | | | | | | | |
| Release atmospheric pressure/oxygen partial pressure | 300 hPa/ 63 hPa | 500 hPa/ 105 hPa | 700 hPa/ 147 hPa | 900 hPa/ 189 hPa | 300 hPa/ 63 hPa | 300 hPa/ 63 hPa | — | 300 hPa/ 63 hPa | 300 hPa/ 63 hPa |
| Lowest atmospheric pressure | 4 hPa | 4 hPa | 4 hPa | 4 hPa | 4 hPa | 4 hPa | 4 hPa | 4 hPa | 4 hPa |
| Cycle | 15 minutes | 15 minutes | 15 minutes | 15 minutes | 10 minutes | 30 minutes | — | 15 minutes | 120 minutes |
| Temperature | 42° C. | 39° C. | 35° C. | 30° C. | 42° C. | 42° C. | 46° C. | 46° C. | 42° C. |
| Time | 40 h | 40 h | 40 h | 60 h | 40 h | 40 h | 40 h | 40 h | 40 h |
| Ratio of polymerized product of first resin layer | 25 pieces/mm³ | 15 pieces/mm³ | 6 pieces/mm³ | 2 pieces/mm³ | 22 pieces/mm³ | 30 pieces/mm³ | 110 pieces/mm³ | 70 pieces/mm³ | 60 pieces/mm³ |
| Appearance evaluation | A (0%) | A (0%) | A (0%) | A (0%) | A (0%) | A (0%) | C (40%) | B (20%) | B (20%) |

EVALUATIONS

In Examples 1 to 8, the polymer having a long diameter of 1 μm to 10 μm contained in the first resin could be reduced by reducing the pressure while controlling the oxygen partial pressure as compared with Comparative Example 1 in which the pressure was continuously reduced. Specifically, the ratio of the polymer could be set to 2 pieces/mm³ to 70 pieces/mm³, so that the laminated diffractive optical element having an excellent appearance could be manufactured at a high rate.

In Examples 1 to 6, the pressure was reduced at a temperature of 30° C. to 42° C. by atmospheric air opening once to 6 times in 1 hour, which allow the ratio of the polymer to be set to 2 pieces/mm³ to 30 pieces/mm³. In all of Examples 1 to 6, the laminated diffractive optical element having an excellent appearance could be manufactured.

A method for manufacturing an optical element can provide an optical element having no appearance malfunction (cloud due to scattering observed when intense light is

What is claimed is:

1. A laminated diffractive optical element comprising:
   a first resin layer having a first diffraction grating shape; and
   a second resin layer having a second diffraction grating shape,
     the first resin layer and the second resin layer laminated in this order on a first substrate so that the diffraction grating shapes oppose each other,
   wherein:
     the first resin layer contains:
       a first part,
       a second part other than the first part, the second part containing a resin that is a cured product of an energy curable resin raw material; and
       conductive particles contained in the second part;
     wherein the first part includes polymer particles formed from the energy curable resin raw material,
     wherein an amount of the polymer particles in the first resin layer is 70 pieces/mm³ or less, and wherein a refractive index of the first part is different from a refractive index of the second part.

2. The laminated diffractive optical element according to claim 1,
wherein the conductive particles are indium tin oxide (ITO).

3. The laminated diffractive optical element according to claim 1,
wherein the refractive index of the first part is higher than the refractive index of the second part, and
wherein the first resin layer contains the resin selected from the group consisting of an acrylic resin, a vinyl resin, and an epoxy resin.

4. The laminated diffractive optical element according to claim 1,
wherein the first resin layer contains 3% by volume to 29% by volume of the conductive particles.

5. The laminated diffractive optical element according to claim 1,
wherein the second resin layer contains a resin selected from the group consisting of an acrylic resin, a vinyl resin, and an epoxy resin.

6. The laminated diffractive optical element according to claim 1,
wherein the second resin layer is provided on a second substrate.

7. The laminated diffractive optical element according to claim 1,
wherein the polymer particles have a diameter of 1 µm to 10 µm, and
wherein the amount of the polymer particles in the first resin layer is 30 pieces/mm$^3$ or less.

8. The laminated diffractive optical element according to claim 1,
wherein the polymer particles have a diameter of 1 µm to 10 µm, and
wherein the amount of the polymer particles in the first resin layer is 2 pieces/mm$^3$ to 30 pieces/mm$^3$.

9. An optical apparatus comprising the laminated diffractive optical element of claim 1.

10. The optical apparatus according to claim 9, wherein the optical apparatus is a camera.

11. The laminated diffractive optical element according to claim 1,
wherein the conductive particles have an average particle size of 1 nm to 100 nm.

12. A method for manufacturing a laminated diffractive optical element,
the laminated diffractive optical element comprising:
a first resin layer having a first diffraction grating shape; and
a second resin layer having a second diffraction grating shape,
the first resin layer and the second resin layer laminated in this order on a first substrate so that the diffraction grating shapes oppose each other,
wherein:
the first resin layer contains:
a first part,
a second part other than the first part, the second part containing a resin that is a cured product of an energy curable resin raw material; and
conductive particles contained in the second part;
wherein the first part includes polymer particles formed from the energy curable resin raw material,
wherein an amount of the polymer particles in the first resin layer is 70 pieces/mm$^3$ or less, and
wherein a refractive index of the first part is different from a refractive index of the second part,
the method comprising the steps of:
repeatedly (1) subjecting a solution obtained by mixing transparent conductive particles and an energy curable resin raw material in a solvent to a reduced pressure of 50 hPa or less and (2) opening an oxygen partial pressure to 60 hPa or more, to eliminate the solvent, thereby obtaining a first resin material;
filling a space between the first substrate and a mold having a diffraction grating shape with the first resin material, and thereafter irradiating the first resin material with energy to obtain the first resin layer; and
providing the second resin layer on the first resin layer so that the first diffraction grating shape of the first resin layer and the second diffraction grating shape of the second resin layer oppose each other.

13. The method according to claim 12,
wherein the method includes a step of filtering the first resin material with a filter between the step of obtaining the first resin material and the step of obtaining the first resin layer.

14. The method according to claim 13,
wherein the first resin material is filtered with a filter having filtration accuracy of 0.3 µm to 0.7 µm in the filtering step.

15. The method according to claim 12,
wherein a content of the solvent in the resin material is 0.1% by mass or less.

16. The method according to claim 12,
wherein the solvent is eliminated by atmospheric air opening one to 6 times in 1 hour in the step of obtaining the resin material.

17. A laminated diffractive optical element comprising:
a first resin layer having a first diffraction grating shape; and
a second resin layer having a second diffraction grating shape,
the first resin layer and the second resin layer laminated in this order on a first substrate so that the diffraction grating shapes oppose each other,
wherein:
the first resin layer contains:
a first part,
a second part other than the first part, the second part containing a resin that is a cured product of an energy curable resin raw material; and
conductive particles contained in the first part and in the second part,
wherein the first part includes polymer particles formed from the energy curable resin raw material,
an amount of the polymer particles in the first resin layer is 70 pieces/mm$^3$ or less, and
wherein content of the conductive particles contained in the first part is less than content of the conductive particles contained in the second part.

18. The laminated diffractive optical element according to claim 17,
wherein the content of the conductive particles contained in the first resin layer as a whole is 3% by volume or more and 29% by volume or less, and
wherein the content of the conductive particles contained in the first part is less than 3% by volume.

19. The laminated diffractive optical element according to claim 17,
wherein the polymer particles have a diameter of 1 µm to 10 µm.

20. The optical apparatus comprising the laminated diffractive optical element of claim 17.

21. The optical apparatus according to claim 20, wherein the optical apparatus is a camera.

* * * * *